US012673408B2

(12) United States Patent
Köhli et al.

(10) Patent No.: US 12,673,408 B2
(45) Date of Patent: Jul. 7, 2026

(54) WORK APPARATUS WITH INTERNAL COMBUSTION ENGINE

(71) Applicant: Andreas Stihl AG & Co. KG, Waiblingen (DE)

(72) Inventors: Robert Köhli, Winnenden (DE); Tilman Seidel, Stuttgart (DE); Mario Kuschewski, Weil der Stadt (DE); Jens Riehmann, Stuttgart (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 5 days.

(21) Appl. No.: 18/809,963

(22) Filed: Aug. 20, 2024

(65) Prior Publication Data

US 2025/0065485 A1 Feb. 27, 2025

(30) Foreign Application Priority Data

Aug. 22, 2023 (DE) ......................... 102023122511.1

(51) Int. Cl.
*F01P 1/06* (2006.01)
*B25F 5/00* (2006.01)
*F01P 5/06* (2006.01)

(52) U.S. Cl.
CPC ................ *B25F 5/008* (2013.01); *F01P 5/06* (2013.01)

(58) Field of Classification Search
CPC . F02M 35/1017; F01P 1/02; F01P 1/06; F01P 5/06
See application file for complete search history.

(56) References Cited

U.S. PATENT DOCUMENTS 3,183,899 A 5/1965 Tuggle
5,269,265 A * 12/1993 Pretzsch ................ F02M 35/06 123/41.7
6,314,922 B1 * 11/2001 Zimmermann ......... F02B 63/02 123/41.7
8,770,157 B2 * 7/2014 Yano ......................... F01P 1/02 123/41.27
9,617,951 B2 * 4/2017 Sotiriades ................. F02F 1/34
2001/0039736 A1 11/2001 Husges et al.
2002/0176787 A1 * 11/2002 Cifarelli ................ B05B 7/2475 417/366

(Continued)

FOREIGN PATENT DOCUMENTS

DE 10021707 A1 11/2001
DE 102015013784 A1 4/2017
JP 2013217363 A 10/2013

*Primary Examiner* — Long T Tran
(74) *Attorney, Agent, or Firm* — Smartpat PLC

(57) ABSTRACT

A work apparatus has an internal combustion engine. The internal combustion engine includes a crankcase in which a crankshaft is mounted rotatably about an axis of rotation. The work apparatus includes a fan spiral and a fan wheel arranged in the fan spiral for conveying cooling air for the internal combustion engine. A cylinder is arranged on the crankcase, and the cylinder includes a first outer side facing the fan wheel and a second outer side facing away from the fan wheel. The fan spiral has a first outlet opening for a first cooling air flow for cooling the first outer side of the cylinder. The fan spiral has a second outlet opening for a second cooling air flow for cooling the second outer side of the cylinder.

15 Claims, 6 Drawing Sheets

(56) References Cited

U.S. PATENT DOCUMENTS

| | | | | |
|---|---|---|---|---|
| 2012/0285410 | A1* | 11/2012 | Stark | F02M 35/0226 123/184.21 |
| 2013/0239911 | A1 | 9/2013 | Ichihashi | |
| 2013/0340693 | A1* | 12/2013 | Schaffer | F01P 5/04 123/41.65 |
| 2014/0000537 | A1* | 1/2014 | Rieber | F01P 1/00 123/41.65 |
| 2017/0167463 | A1* | 6/2017 | Wolf | B27B 17/08 |
| 2019/0153926 | A1* | 5/2019 | Lank | F01P 1/06 |

* cited by examiner

WORK APPARATUS WITH INTERNAL COMBUSTION ENGINE

CROSS-REFERENCE TO RELATED APPLICATION

This application claims the benefit of German Patent Application DE 10 2023 122 511.1, filed on Aug. 22, 2023, the content of which is incorporated in its entirety.

BACKGROUND

Work apparatuses with internal combustion engines usually have a cooling system whose task is to cool the internal combustion engine in order to avoid damage to the engine, especially to individual components such as seals, etc. Conventional systems consist of a fan wheel, which is arranged in a fan spiral and is driven in rotation by the internal combustion engine. The fan wheel generates a cooling air flow, which is directed specifically to the cylinder of the internal combustion engine via the fan spiral. In order for the cylinder to be cooled efficiently and uniformly, the cylinder is provided with a plurality of cooling fins. The cooling air flow can flow around the entire cylinder through the cooling fins. This is an attempt to ensure that the cylinder is cooled as evenly as possible. Furthermore, the surface area of the cylinder is increased by the cooling fins so that efficient heat transfer from the cylinder to the cooling air can take place.

The disadvantage of such systems is that during operation of the internal combustion engine, increased temperature differences can occur in the cylinder, which in turn can cause undesirable thermal stresses.

SUMMARY

The present application presents a work apparatus with an internal combustion engine that has been improved in such a way that the most homogeneous temperature distribution possible is achieved during operation of the internal combustion engine.

The internal combustion engine of the work apparatus comprises a crankcase in which a crankshaft is mounted rotatably about an axis of rotation. The work apparatus comprises a fan spiral and a fan wheel arranged in the fan spiral for conveying cooling air for the internal combustion engine. A cylinder is arranged on the crankcase. The cylinder comprises a first outer side facing the fan wheel and a second outer side facing away from the fan wheel. The fan spiral has a first outlet opening for a first cooling air flow for cooling the first outer side of the cylinder. The fan spiral has a second outlet opening for a second cooling air flow for cooling the second outer side of the cylinder.

The second cooling air flow is branched off from the fan spiral and directed directly to the second outer side of the cylinder. The second cooling air flow is not guided over the first outer side of the cylinder. Excessive heating of the second cooling air flow even before it reaches the second outer side of the cylinder is thus avoided. The first cooling air flow cools the first outer side of the cylinder. The second cooling air flow cools the second outer side of the cylinder. The first outer side of the cylinder and the second outer side of the cylinder are arranged opposite one another with respect to a longitudinal plane of the cylinder. The longitudinal plane of the cylinder is arranged perpendicular to the axis of rotation of the crankshaft. The longitudinal center axis of the cylinder is in the longitudinal plane. The cylinder is thus cooled uniformly from two opposite sides. The temperature differences in the cylinder as well as the resulting thermal stresses can be significantly reduced.

In particular, it is provided that the first outlet opening and the second outlet opening have an angular distance of less than 90°, measured relative to the axis of rotation of the crankshaft. The angular distance between the first outlet opening and the second outlet opening is particularly preferably less than 60°, in particular less than 40°, preferably less than 10°. Thus, both the first outlet opening and the second outlet opening are located in an overpressure region of the fan spiral, in particular in a region of the fan spiral in which a similar overpressure is present. This allows the volume flow of the cooling air flows to be adjusted and the most even possible cooling effect to be set on the first and second outer sides of the cylinder. The first outlet opening is arranged such that the first cooling air flow flows tangentially out of the fan spiral. Thus, the first cooling air flow in the region of the outlet opening also runs approximately tangential to the axis of rotation of the crankshaft. In particular, a scoop is provided on the fan spiral at the second outlet opening. The second outlet opening is arranged in the fan spiral in such a way that the second cooling air flow flows through the rear wall of the fan spiral in the direction of the axis of rotation of the crankshaft.

In particular, it is provided that the fan spiral extends radially to the axis of rotation of the crankshaft from a radial inner side to a radial outer side. The fan spiral can be divided in half radially to the axis of rotation into an inner zone and an outer zone. The second outlet opening lies essentially in the inner zone of the fan spiral. In particular, the second outlet opening adjoins the radial inner side of the fan spiral. Accordingly, the second outlet opening is preferably arranged radially inside of the fan spiral. Due to the centrifugal forces occurring in the air flows of the fan spiral, dirt is carried essentially radially outward. The radially inner arrangement of the second outlet opening prevents dirt from flowing into the radially inner outlet opening.

It is in particular provided that the internal combustion engine comprises a cooling air duct. The cooling air duct is flow-connected to the second outlet opening of the fan spiral and extends from the fan spiral to the second outer side of the cylinder. The second cooling air flow runs in the cooling air duct to the second outer side of the cylinder. The cooling air duct has, in particular, an outlet opening which is designed in such a way that the second cooling air flow is directed at the second outer side of the cylinder. The second cooling air flow is directed specifically at the second outer side of the cylinder via the outlet opening of the cooling air duct. The cooling air duct has, in particular, a minimum flow cross-section of at least 50 $mm^2$. This ensures sufficient cooling air to cool the second outer side of the cylinder.

It is in particular provided that the cooling air duct runs at least partially along an outer side of the crankcase. The cooling air duct is preferably at least partially delimited by the outer side of the crankcase. This enables a particularly compact design of the internal combustion engine.

In particular, the cooling air duct comprises a further outlet opening for cooling an injector of the internal combustion engine. This prevents the fuel from heating up. If the fuel is too hot, vapor bubbles can form, which impair the supply of fuel to the internal combustion engine. Especially in fuel systems with low fuel pressure, vapor bubble formation is observed even at comparatively low temperatures.

It is in particular provided that the internal combustion engine comprises a duct part. The duct part, arranged on the crankcase, forms the cooling duct, and at least partially surrounds a cylinder flange for forming the intake duct in the region of the cylinder. Furthermore, the internal combustion engine preferably comprises a cover. The cover extends over the cylinder and, interacting with the duct part, engages around the cylinder flange in a sealed manner. The duct part and the cover thus thermally shield the cylinder. The internal combustion engine is divided into a hot zone and a cool zone. The cylinder, which is surrounded by the cover and the duct part, is part of the hot zone. Outside the cover and the duct part is an area of the cool zone. In particular, components which are sensitive to elevated temperature, for example fuel lines or fuel pumps, electronics or the like, are arranged in the cool zone. Thus, the duct part has a dual function. On the one hand, the duct part forms the cooling air duct with the crankcase, and on the other hand, the duct part is part of the thermal insulation of the cylinder. This dual function eliminates the need for additional components for thermal insulation.

In particular, it is provided that the crankshaft of the internal combustion engine has an output side to which a tool or means for driving the tool can be connected. The crankshaft has an end side opposite the output side. The fan wheel is arranged on the end side of the crankshaft. In an alternative embodiment, it can be expedient to provide the fan wheel with the fan spiral on the output side of the crankshaft.

An embodiment of the invention is explained below with reference to the drawings.

DETAILED DESCRIPTION

Figure 1:
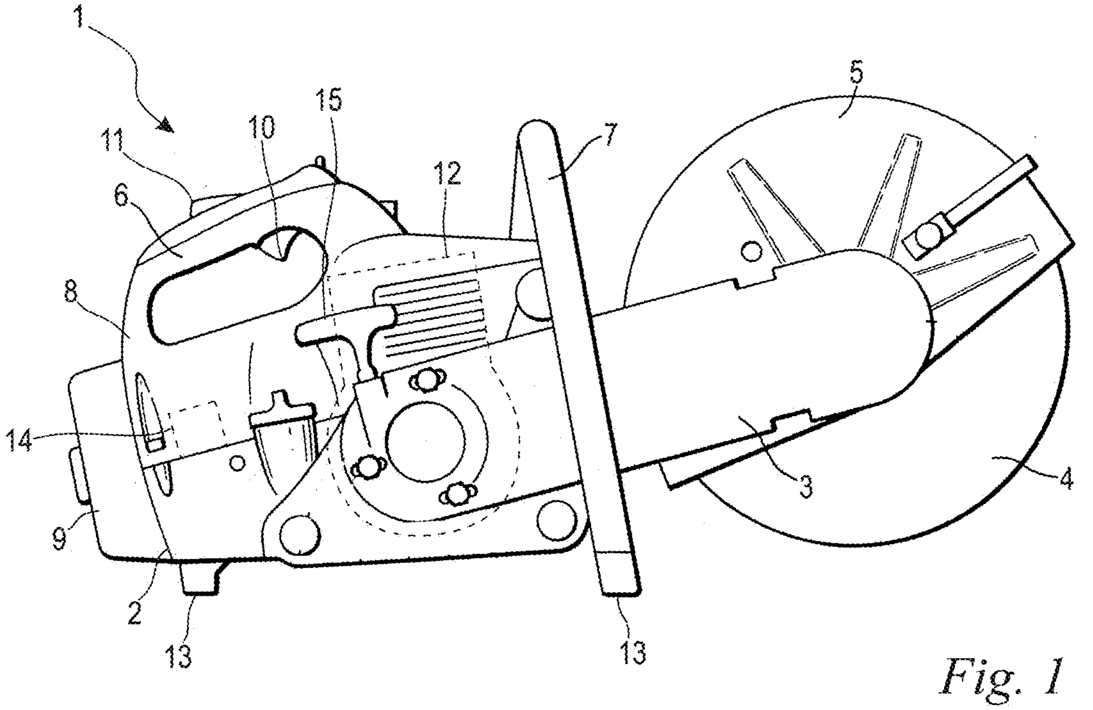
FIG. 1 shows aside view of a cut-off machine.

FIG. 1 shows an exemplary embodiment of the work apparatus 1, which in the present case is designed as a handheld cut-off machine. The present invention is also advantageous for other work apparatuses, in particular for handheld work apparatuses such as chainsaws, brush cutters, blowers or the like. The work apparatuses can be hand-carried, carried on the back or pushed along the ground, such as lawn mowers or cut-off machines with guide carriages.

The work apparatus 1 has a housing 2, to which an arm 3 is fixed. At the free end of the arm 3, a cutting wheel 4 is rotatably mounted, which is partially covered on its circumference by a protective hood 5. An upper handle 6, which is in particular formed in one piece with an upper housing body 8 of the housing 2, and a handle tube 7, which engages over the housing 2 on the front side of the housing 2 facing the cutting wheel 4, are used to guide the cut-off machine 1. A throttle lever 10 and a throttle lever lock 11 are mounted, in particular pivotably, on the upper handle 6. Instead of the upper handle 6, a rear handle can also be provided. An air filter cover 9 is fixed to the housing 2 on the side of the housing 2 facing away from the cutting wheel 4. An internal combustion engine 12 is arranged in the housing 2 and can be started via a starting device. The starting device can be operated via a starter handle 15. However, an electric starting device can also be provided. In the housing 2 there is also arranged a fuel pump 14, shown schematically in FIG. 1, which serves to deliver fuel to the internal combustion engine 12. The cut-off machine 1 has feet 13 with which it can be placed, for example, on the ground or on another surface.

Figure 2:
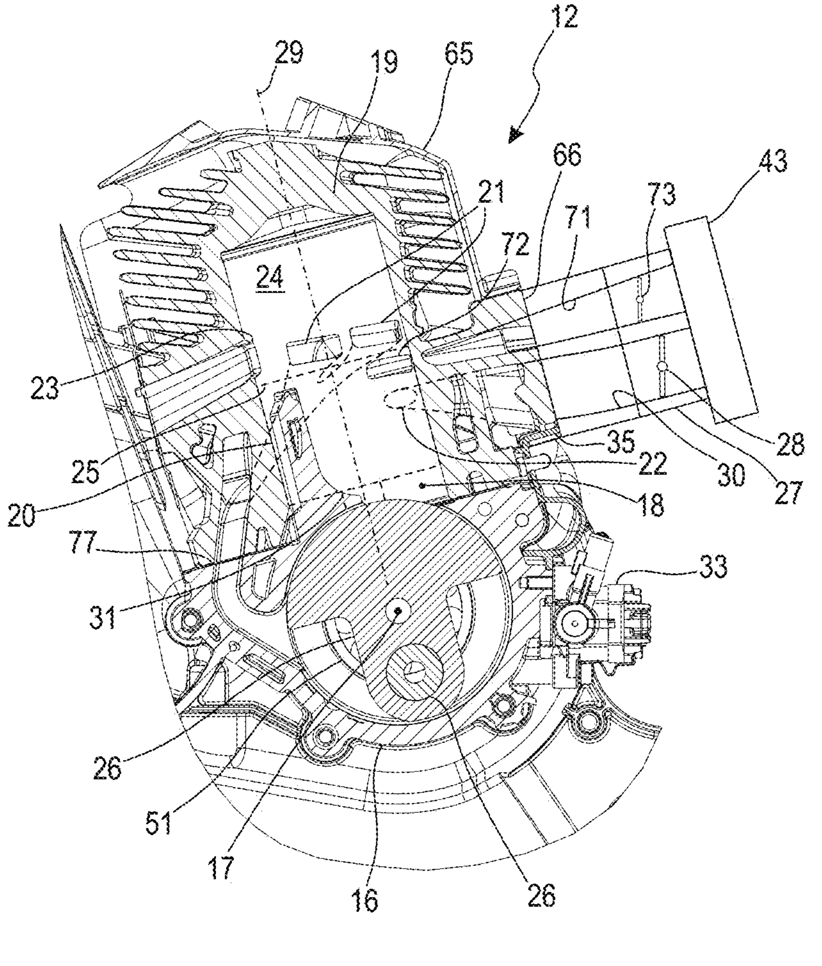
FIG. 2 shows a partially schematic section through the internal combustion engine of the cut-off machine according to FIG. 1.

FIG. 2 shows the internal combustion engine 12 in detail. The internal combustion engine 12 has a cylinder 19, which is placed on a crankcase 16 at a separating plane 77. In the crankcase 16, a crankshaft 26 with bearings 51 is mounted so as to be rotatable about an axis of rotation 17. The bearings 51 are designed as ball bearings. The crankshaft 26 is supported by bearings on both sides of a connecting rod 31, which serves to connect to a piston 25. The connecting rod 31 and the piston 25 are shown only schematically in FIG. 2. A bearing 51 is arranged in the first housing part 36 and a further bearing 51 is arranged in the second housing part 37. The crankshaft 26 is driven in rotation by the piston 25, which is mounted in the cylinder 19 so as to reciprocate in the direction of a longitudinal cylinder axis 29. The piston 25 delimits a combustion chamber 24 formed in the cylinder 19. The internal combustion engine 12 has an air filter 43 through which air is sucked in during operation. An inlet 22 is slot-controlled by the piston 25 and opens into the cylinder 19 when the piston 25 is in a region of its top dead center. The inlet 22 is then connected to the crankcase interior 18 and supplies combustion air into the crankcase interior 18. The combustion air is supplied via an intake duct 30 downstream of the air filter 43, which is guided over a partial section in a throttle housing 27. In particular, at least one throttle element on which the throttle lever 10 acts, in the exemplary embodiment a throttle valve 28, is pivotally mounted in the throttle housing 27. An outlet 23, which is also slot-controlled by the piston 25, leads out of the combustion chamber 24.

As shown in FIG. 2, the internal combustion engine 12 comprises a further air duct 71, which opens into the bore of the cylinder 19 via an air inlet 72. The further air duct 71 is also downstream of the air filter 43 and runs through the throttle housing 27. The throttle housing 27 comprises a further throttle element designed as a further throttle valve 73, on which the throttle lever 10 acts. Alternatively, it can also be provided that both ducts 30, 71 are jointly controlled by a throttle element. The piston 25 has one or more piston pockets (not shown) on its piston skirt. The piston pocket connects the air inlet 72 with one or more transfer windows in the area of the top dead center of the piston 25. Via the further air duct 71, air can thereby be placed upstream in the transfer duct 20, which serves to flush the combustion chamber 24.

A holder 33 is arranged on the outer circumference of the crankcase 16. A receptacle 34 (FIG. 3) for an injector (not shown in more detail) is formed in the holder 33. The injector supplies the fuel directly into the crankcase interior 18 via an outlet duct formed in the holder 33. The holder 33 is arranged below the inlet 22 and the throttle housing 27. In an alternative embodiment, it can also be provided that the injector with its receptacle is arranged in such a way that it does not supply the fuel into the crankcase interior 18, but into the intake duct 30 and/or into the further air duct 71. The crankcase interior 18 is connected to the combustion chamber 24 via one or more transfer ducts 20. In the exemplary embodiment, a transfer duct 20 is provided, which is divided into a plurality of branches and opens into the combustion chamber 24 with a plurality of transfer windows 21. The transfer windows 21 are also controlled by the piston 25 and open to the combustion chamber 24 in the region of the bottom dead center of the piston 25.

In operation, combustion air is sucked into the crankcase interior 18 from the intake duct 30 via the inlet 22 in the region of the top dead center of the piston 25. The combustion air is compressed in the crankcase interior 18 during the downward stroke of the piston 25. Fuel is also supplied into the crankcase interior 18 via the injector. The fuel/air mixture flows into the combustion chamber 24 in the region of the bottom dead center of the piston 25 via the transfer duct 20 and the transfer windows 21. During the upward stroke of the piston 25, the fuel/air mixture is compressed in the combustion chamber 24 and ignited in the region of the top dead center of the piston 25 by a spark plug (not shown). The piston 25 is accelerated towards the bottom dead center by the combustion in the combustion chamber 24. As soon as the outlet 23 from the piston 25 is opened, the exhaust gases from the cylinder 19 flow into an exhaust muffler (not shown) connected to the outlet 23.

Figure 3:
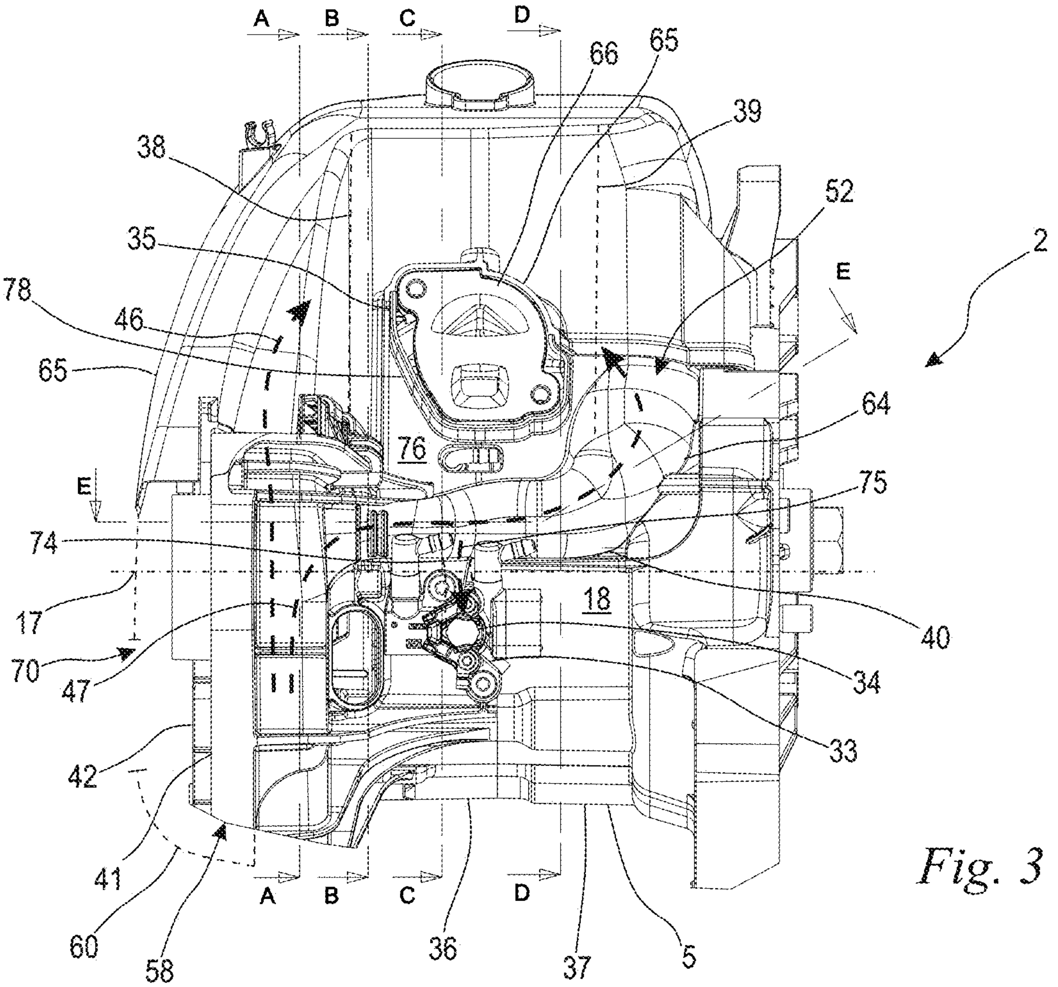
FIG. 3 shows aside view of the internal combustion engine of the cut-off machine.
Figure 4:
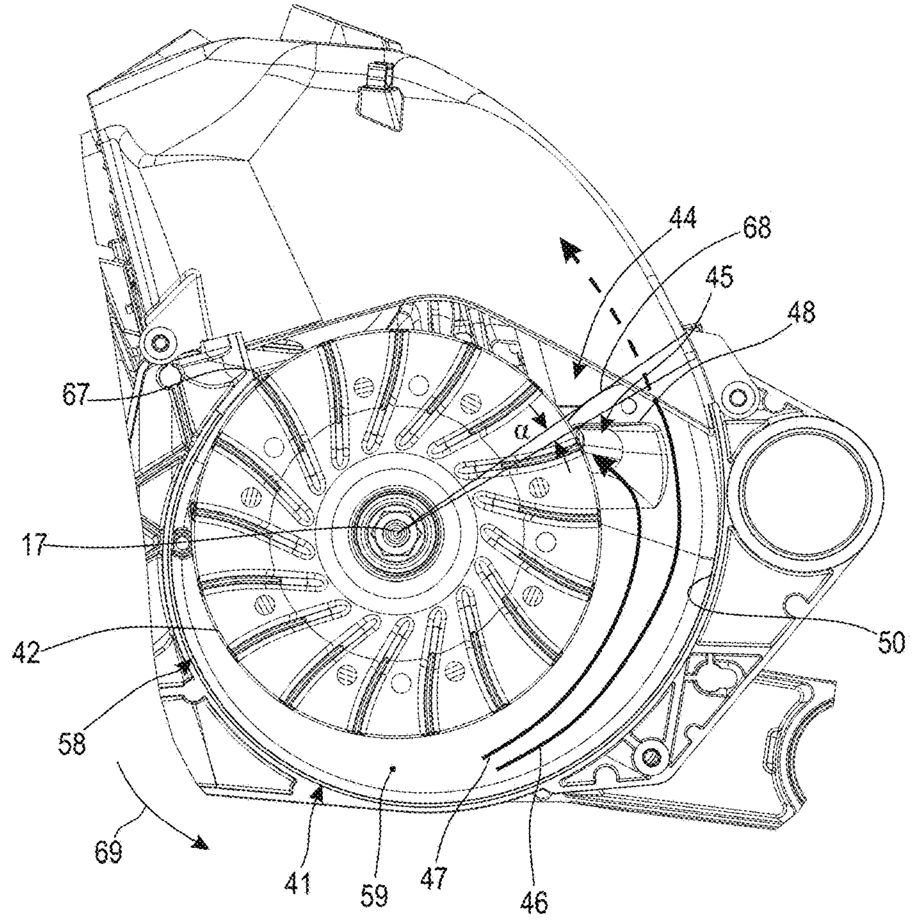
FIG. 4 is a view in the direction of the axis of rotation of the crankshaft of the internal combustion engine of the cut-off machine according to FIG. 1.

As shown in FIGS. 3 and 4, the internal combustion engine 12 comprises a fan housing 58. The fan housing 58 forms a fan spiral 41. A fan wheel 42, which is driven in rotation by the crankshaft 26, is arranged in the fan housing 58. The fan wheel 42 is in particular connected to the crankshaft 26 in a rotationally fixed manner. The fan spiral 41 has a rear wall 59, the rear wall 59 being arranged between the fan wheel 42 and the cylinder 19. The fan wheel 42 is covered with respect to the environment by the fan wheel cover 60 shown schematically in FIG. 3 and by a cover 65.

Figure 6:
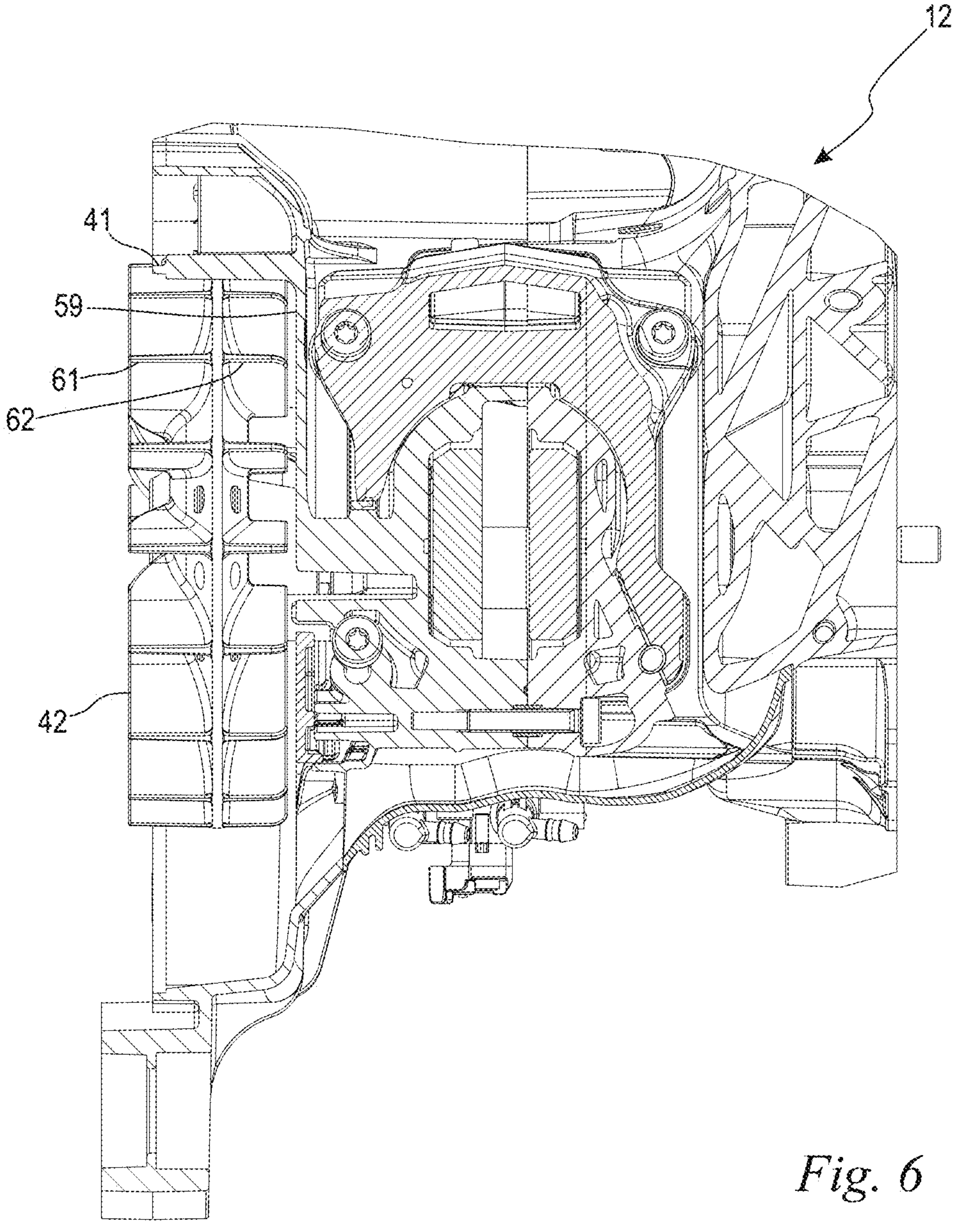
FIG. 6 is a sectional view in the direction of the arrows E along the dividing line between the arrows E according to FIG. 3 of the internal combustion engine.
Figure 7:
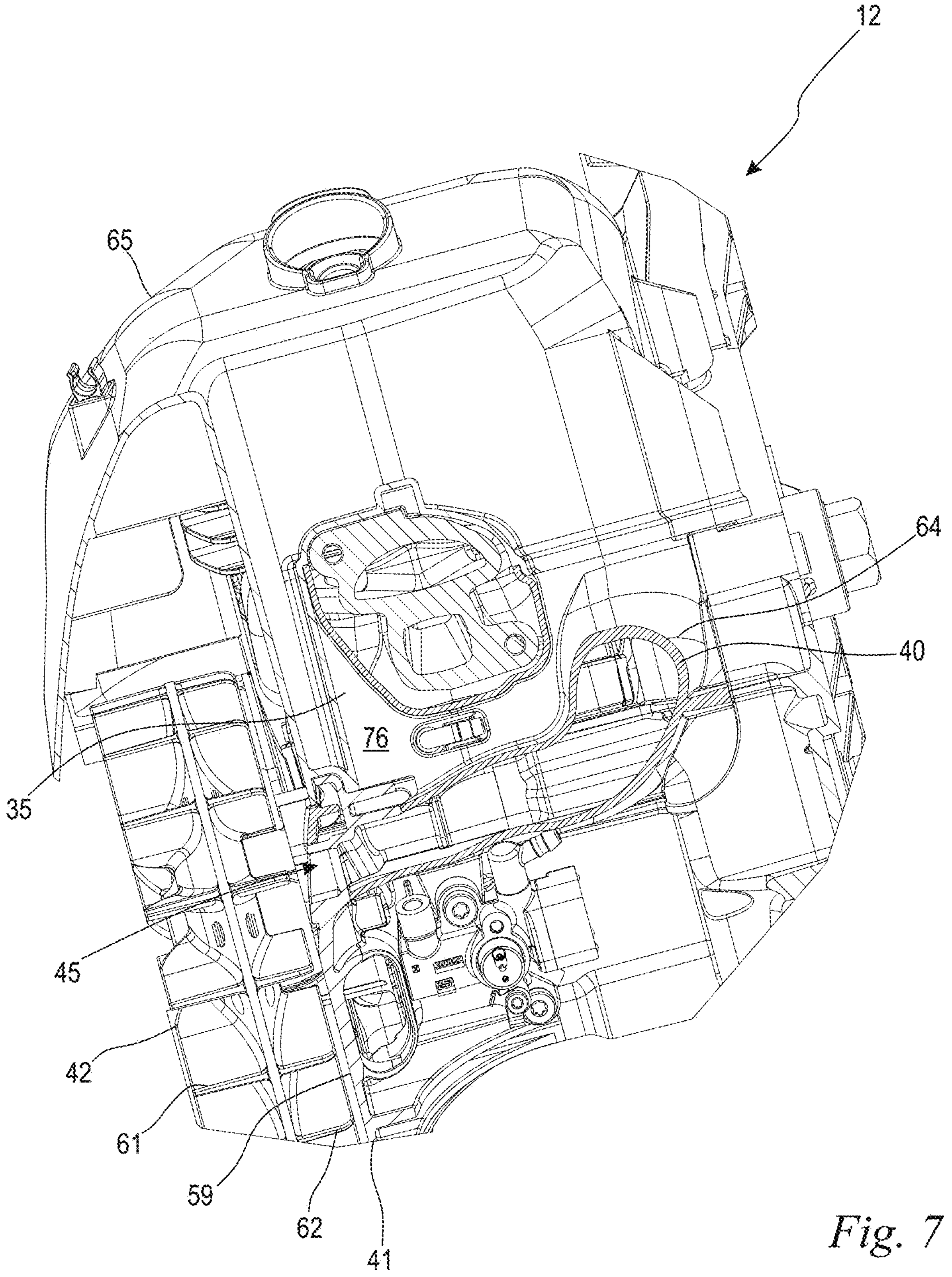
FIG. 7 is a sectional view of the internal combustion engine through the cooling air duct.

As shown in FIGS. 6 and 7, the fan wheel 42 has front side blades 61 on its side facing away from the rear wall 59 of the fan spiral 41 and rear side blades 62 on its side facing the rear wall 59 of the fan spiral 41. Alternatively, it can also be provided that the fan wheel 42 has blades on only one side, namely on the front side or on the rear side.

As shown in FIG. 3, the fan housing 58 is integrally formed on the first housing part 36 of the crankcase 16 in the exemplary embodiment. Alternatively, it may also be provided to form the fan housing 36 as a separate component. The fan housing 36 can be one-piece or multi-piece and can at least partially be made of plastic. The fan housing can also be formed and delimited partially or completely by adjacent components.

Figure 5:
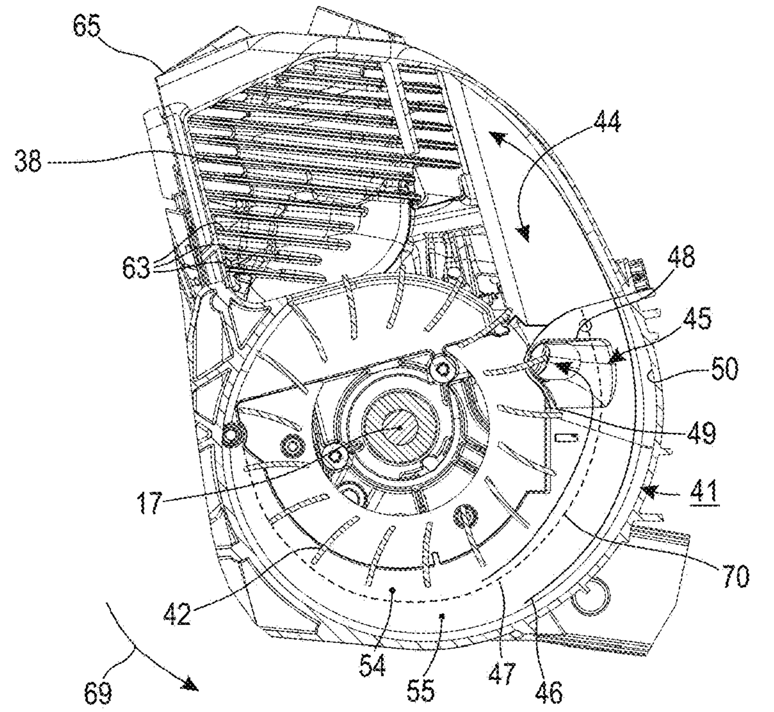
FIG. 5 is a sectional view in the direction of the arrows A along the dividing line between the arrows A according to FIG. 3 of the internal combustion engine.

As shown in FIGS. 4 and 5, a first outlet opening 44 is formed in an overpressure region of the fan spiral 41. The fan wheel 42 is driven during operation of the internal combustion engine 12 and generates a cooling air flow. For this purpose, the cooling air is drawn in from the environment via openings 70 in the fan wheel cover 60 (FIG. 3). The fan wheel 42 generates a first cooling air flow 46. The cooling air flow 46 flows out of the first outlet opening 44 of the fan spiral 41 and flows to the cylinder 19. The cylinder 19 has a first outer side 38 and a second outer side 39. The first outer side 38 of the cylinder 19 is the side of the cylinder 19 facing the fan wheel 42 with respect to the direction of the axis of rotation 17 of the crankshaft 26. The second outer side 39 of the cylinder 19 is the side of the cylinder 19 facing away from the fan wheel 42 with respect to the direction of the axis of rotation 17 of the crankshaft 26. The first outer side 38 and the second outer side 39 are arranged opposite one another with respect to a longitudinal plane of the cylinder 19, which is aligned perpendicular to the axis of rotation 17 of the crankshaft 26 and completely contains the cylinder longitudinal axis 29. The first outlet opening 44 of the fan spiral 41 is arranged opposite the cylinder 19 such that the first cooling air flow 46 flows against the first outer side 38 of the cylinder 19. As shown in particular in FIG. 5, the cylinder 19 comprises a plurality of cooling fins 63, between which the first cooling air flow 46 flows. The cooling air flowing to the cylinder 19 is distributed between the cooling fins 63 of the cylinder 19, thereby cooling it.

As shown in particular in FIG. 4, the fan spiral 41 comprises a second outlet opening 45. The second outlet opening 45 is arranged in an overpressure region of the fan spiral 41. The second outlet opening 45 serves to branch off a second cooling air flow 47. The second cooling air flow 47 flows to the second outer side 39 of the cylinder 19 in order to cool it (FIG. 3). The second outlet opening 45 is arranged on the rear wall 59 of the fan spiral 41 and penetrates it, in particular completely. The second outlet opening 45 extends in the direction of the axis of rotation 17 of the crankshaft 26 and opens into a cooling air duct 40 (FIG. 3). The cooling air duct 40 extends in the direction of the axis of rotation 17 of the crankshaft 26 from the first outer side 38 of the cylinder 19 to the second outer side 39 of the cylinder 19. The cooling air duct 40 runs between the cylinder flange 66 for the intake duct 30 and the holder 33 for receiving the injector. The cooling air duct 40 runs along the crankcase 16. In the preferred exemplary embodiment, the cooling air duct 40 runs on an outer side 32 of the crankcase 16. The cooling air duct 40 has an outlet opening 52 which is designed in such a way that the second cooling air flow 47 flows directly to the second outer side 39 of the cylinder 19 and cools the latter.

As shown in FIG. 3, the cooling air duct 40 is at least partially formed from a duct part 35. The duct part 35 rests on the outer side 32 of the crankcase 16. The duct part 35 comprises a curvature 64 formed with respect to the crankcase 16, the cooling air duct 40 being formed by the curvature 64 of the duct part 35 and by the outer side 32 of the crankcase 16. Accordingly, the cooling air duct 40 is also delimited by the outer side 32 of the crankcase 16. The duct part 35 connects to the fan spiral 41 and surrounds the second outlet opening 45 of the fan spiral 41 in a sealing manner. The duct part 35 extends as far as the second outer side 39 of the cylinder 19, with the curvature 64 forming the further outlet opening 53 of the cooling duct 40 in the region of the second outer side 39 of the cylinder 19 (see also FIG. 6).

As shown in FIGS. 4 and 5, the first outlet opening 44 and the second outlet opening 45 are arranged adjacent to one another. Thus, both outlet openings 44, 45 can be arranged in the overpressure region of the fan spiral 41, so that sufficient volume flow is ensured for the first cooling air flow 46 and the second cooling air flow 47. The first outlet opening 44 and the second outlet opening 45 have an angular distance a of less than 90°, measured relative to the axis of rotation 17 of the crankshaft 26. The fan spiral 41 extends in the direction of rotation 69 from a first end 67 to a second end 68. The second outlet opening 44 is arranged at the second end 67 of the fan spiral 41. Particularly preferably, the angular distance a between the first outlet opening 44 and the second outlet opening is less than 60°, in particular less than 40°, preferably less than 10°. A scoop 48 is provided on the fan spiral 41 at the second outlet opening 45. In an alternative embodiment, a further outlet opening with a further scoop could also be provided in order to divert a further cooling air flow from the fan spiral for the targeted cooling of a component of the internal combustion engine 12.

As shown in FIGS. 4 and 5, the fan spiral 41 extends radially to the axis of rotation 17 from a radial inner side 49 to a radial outer side 50. As shown in FIG. 5, the fan spiral 41 is divided into an inner zone 54 and an outer zone 55 radially to the axis of rotation 17. The subdivision is illustrated schematically by a dashed imaginary dividing line 70, wherein the imaginary dividing line 70 has essentially the same distances from the radial inner side 49 and from the radial outer side 50 in the radial direction with respect to the axis of rotation 17. Thus, the fan spiral 41 is divided in half into the inner zone 54 and the outer zone 55 radially to the axis of rotation 17. The second outlet opening 45 is located essentially in the inner zone 54 of the fan spiral 41. As shown in particular in FIG. 5, the second outlet opening 45 adjoins the radial inner side 49 of the fan spiral 41.

As shown in FIG. 3, in an advantageous embodiment of the work apparatus 1 according to the invention, a further cooling duct 74 may be provided, which serves to cool the injector. The further cooling duct 74 runs from the cooling duct 40 to the holder 33. During operation of the internal combustion engine 12, a further cooling air flow 75 is thus branched off from the second cooling air flow 47, which flows to the holder 33 and cools the injector. The further cooling duct 74 and the further cooling air flow 75 are indicated by dashed lines in FIG. 3. It may also be expedient to branch off the further cooling air flow 75 directly from the fan spiral 41. In such an embodiment, a further outlet opening would be provided on the fan spiral 41, which in turn opens into a cooling air duct 40, which extends as far as the holder 33.

Figure 8:
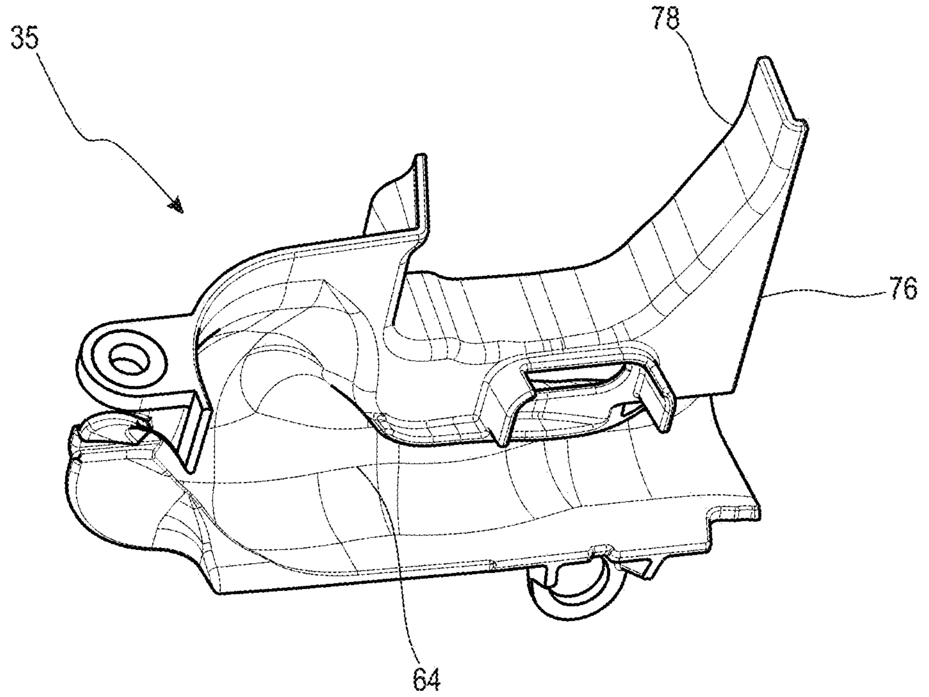
FIG. 8 shows a perspective view of the duct part for the cooling air duct.

As shown in FIGS. 3 and 8, the duct part 35 comprises an insulation section 76 in addition to the curvature 64. The insulation section 76 extends from the curvature 64 over the crankcase 16, the parting line 77 between the crankcase 16 and the cylinder 19 and overlaps parts of the outer side of the cylinder 19. In addition, the duct part 35 has a collar 78, which at least partially surrounds the cylinder flange 66. The duct part 35 engages with the cover 65 of the cylinder 19. The duct part 35 and the cover 65 overlap. The curvature 64 of the duct part 35 rests essentially on the outer side 32 of the crankcase 16. The insulation section 76 rests essentially in the region of the outer side of the cylinder 19. The duct part 35, together with the cover 65, thermally shields the cylinder 19. The thermal shielding creates a cool zone outside the shielding as well as a hot zone inside the shielding, i.e. in the area of the cylinder 19. The duct part 35 therefore has a dual function, namely, on the one hand, the provision of a cooling air duct 40 by means of the curvature 64 and, on the other hand, the provision of thermal insulation of the cylinder 19 by means of the insulation section 76. Of course, the cooling duct 40, that is to say the curvature 64 of the duct part 35, also has a thermally insulating effect. However, the additional insulation section 76 eliminates the need for a separate insulation component.

On the output side, a mounting flange (not shown in more detail) is provided on the internal combustion engine 12, to which a centrifugal clutch of the work apparatus 1 is preferably attached. In the present exemplary embodiment, a pulley (not shown) for driving the drive belt for the cutting wheel 4 and a starting device for the internal combustion engine 12 are arranged. Furthermore, the arm 3 is preferably fixed to the mounting flange.

Figure 9:
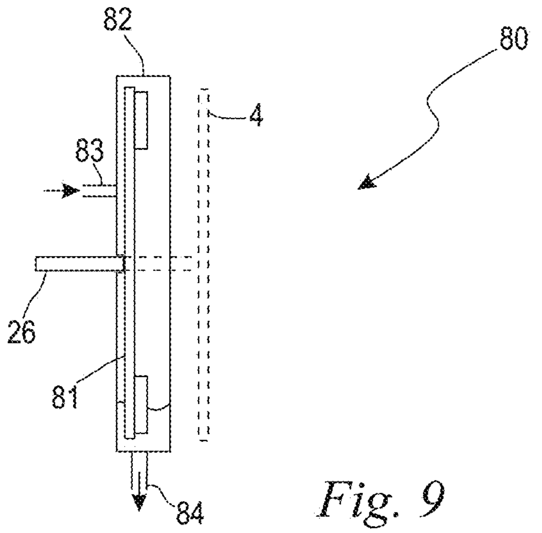
FIG. 9 shows a schematic view of a water brake.

As shown schematically in FIG. 9, the work apparatus 1 preferably comprises a brake 80 for reducing the rotational speed of the internal combustion engine 12. If the speed of the internal combustion engine 12 is above a target speed during operation, the internal combustion engine 12 is slowed down by the brake to a speed below the target speed. The operational readiness of the work apparatus 1 is maintained, so that the tool is not braked to a standstill by this brake. This is therefore not a run-out or standstill brake. The brake 80 is only intended to prevent particularly high rotational speeds. High engine speeds can lead to high exhaust gas emissions, as a result of which the internal combustion engine 12, in particular a exhaust gas catalytic converter, is subject to the highest thermal loads. As shown in FIG. 9, the brake 80 is designed as a water brake. The brake 80 is operatively connected to the crankshaft 26. The brake 80 comprises a stationary chamber 82 and an impeller 81 rotatable in the chamber 82. The impeller 81 is permanently operatively connected to the crankshaft 26 or can be operatively connected to the crankshaft 26 depending on the operating state of the work apparatus 1. The chamber 82 is fixedly connected to the housing 2 of the work apparatus 1. The chamber 82 comprises at least one inlet valve 83 and at least one outlet valve 84, wherein water can be supplied to the chamber 82 via the inlet valve 83 and the water can flow out of the chamber 82 via the outlet valve 84. If the chamber 82 is filled with water, the impeller 81 rotates with its blades through the water, which creates friction and brakes the crankshaft 26. The braking power of the brake 80 can be adjusted via the water level in the chamber 82. If no braking action is required, the water can be drained from the brake chamber 82. In addition, the brake chamber 82 could also be supplied with air alone or with air in addition to the water, whereby an even finer adjustment of the braking effect can be achieved. The water can be exchanged in the brake chamber 82 so that overheating of the water can be avoided. In a particularly preferred embodiment, the water from the brake chamber 82 can further be used to cool the cutting wheel 4.

What is claimed is:

1. A work apparatus, comprising:

an internal combustion engine (12), including
  a crankcase (16) in which a crankshaft (26) is mounted rotatably about an axis of rotation (17), and
  a cylinder (19) arranged on the crankcase (16);
a fan spiral (41) having
  a first outlet opening (44) for a first cooling air flow (46) and
  a second outlet opening (45) for a second cooling air flow (47);
a fan wheel (42) arranged in the fan spiral (41) for conveying cooling air for the internal combustion engine (12); and
a cooling air duct (40) flow-connected to the second outlet opening (45) of the fan spiral (41) and extending from the fan spiral (41) around the cylinder (19),
wherein the cylinder (19) has
  a first outer side (38) facing the fan wheel (42) and
  a second outer side (39) facing away from the fan wheel (42),
wherein the first cooling air flow (46) exits the fan spiral (41) through the first outlet opening (44) proximal to the first outer side (38) of the cylinder (19), and wherein the second cooling air flow (47) flows through the cooling air duct (40) around the cylinder (19) and exits the cooling air duct (40) proximal to the second outer side (39) of the cylinder (19).

2. The work apparatus according to claim 1,
wherein the first outlet opening (44) and the second outlet opening (45) have an angular distance (α) of less than 90°, measured relative to the axis of rotation (17) of the crankshaft (26).

3. The work apparatus according to claim 2,
wherein the angular distance (α) between the first outlet opening (44) and the second outlet opening (45) is less than 60°.

4. The work apparatus according to claim 1,
wherein a scoop (48) is provided on the fan spiral (41) at the second outlet opening (45).

5. The work apparatus according to claim 1,
wherein the fan spiral (41) extends radially to the axis of rotation (17) of the crankshaft (26) from a radial inner side (49) to a radial outer side (50),
wherein the fan spiral (41) can be conceptually divided radially to the axis of rotation (17) in half into an inner zone (54) and an outer zone (55), and
wherein the second outlet opening (45) lies substantially in the inner zone (54) of the fan spiral (41).

6. The work apparatus according to claim 5,
wherein the second outlet opening (45) adjoins the radial inner side (49) of the fan spiral (41).

7. The work apparatus according to claim 1,
wherein the cooling air duct (40) has an outlet opening (52) which is designed in such a way that the second cooling air flow (47) is directed at the second outer side (39) of the cylinder (19).

8. The work apparatus according to claim 1,
wherein the cooling air duct (40) has a minimum flow cross-section of at least 50 $mm^2$.

9. The work apparatus according to claim 1,
wherein the cooling air duct (40) runs at least partially along an outer side (32) of the crankcase (16).

10. The work apparatus according to claim 9,
wherein the cooling air duct (40) is at least partially delimited by the outer side (32) of the crankcase (16).

11. The work apparatus according to claim 1,
wherein the cooling air duct (40) comprises a further outlet opening (53) for cooling an injector of the internal combustion engine (12).

12. The work apparatus according to claim 1,
wherein the internal combustion engine (12) comprises a duct part (35),
wherein the duct part (35), arranged on the crankcase (16), forms the cooling air duct (40), and at least partially surrounds a cylinder flange (66) for forming an intake duct (30) in a region of the cylinder (19).

13. The work apparatus according to claim 12,
wherein the internal combustion engine (12) comprises a cover (65),
wherein the cover (65) extends over the cylinder (19) and, interacting with the duct part (35), engages around the cylinder flange (66) in a sealed manner.

14. The work apparatus according to claim 1,
wherein the crankshaft (26) of the internal combustion engine (12) has an output side (56) to which a tool or means for driving the tool can be connected,
wherein the crankshaft (26) has an end side (57) opposite the output side (56), and
wherein the fan wheel (42) is arranged on the end side (57) of the crankshaft (26).

15. A work apparatus, comprising:
an internal combustion engine (12), including
a crankcase (16) in which a crankshaft (26) is mounted rotatably about an axis of rotation (17), and
a cylinder (19) arranged on the crankcase (16);
a fan spiral (41); and
a fan wheel (42) arranged in the fan spiral (41) for conveying cooling air for the internal combustion engine (12),
wherein the cylinder (19) has
a first outer side (38) facing the fan wheel (42) and
a second outer side (39) facing away from the fan wheel (42),
wherein the fan spiral (41) has
a first outlet opening (44) for a first cooling air flow (46) for cooling the first outer side (38) of the cylinder (19), and
a second outlet opening (45) for a second cooling air flow (47) for cooling the second outer side (39) of the cylinder (19), the second outlet opening (45) being flow-connected to a cooling air duct (40), and
wherein the cooling air duct (40) extends from the fan spiral (41) to an outlet opening (52) located adjacent to the second outer side (39) of the cylinder (19), the outlet opening (52) being configured to direct the second cooling air flow (47) towards the second outer side (39) of the cylinder (19).

* * * * *